(No Model.)
J. W. THOMPSON.
CYLINDER FOR STEAM ENGINE INDICATORS.
No. 244,094. Patented July 12, 1881.
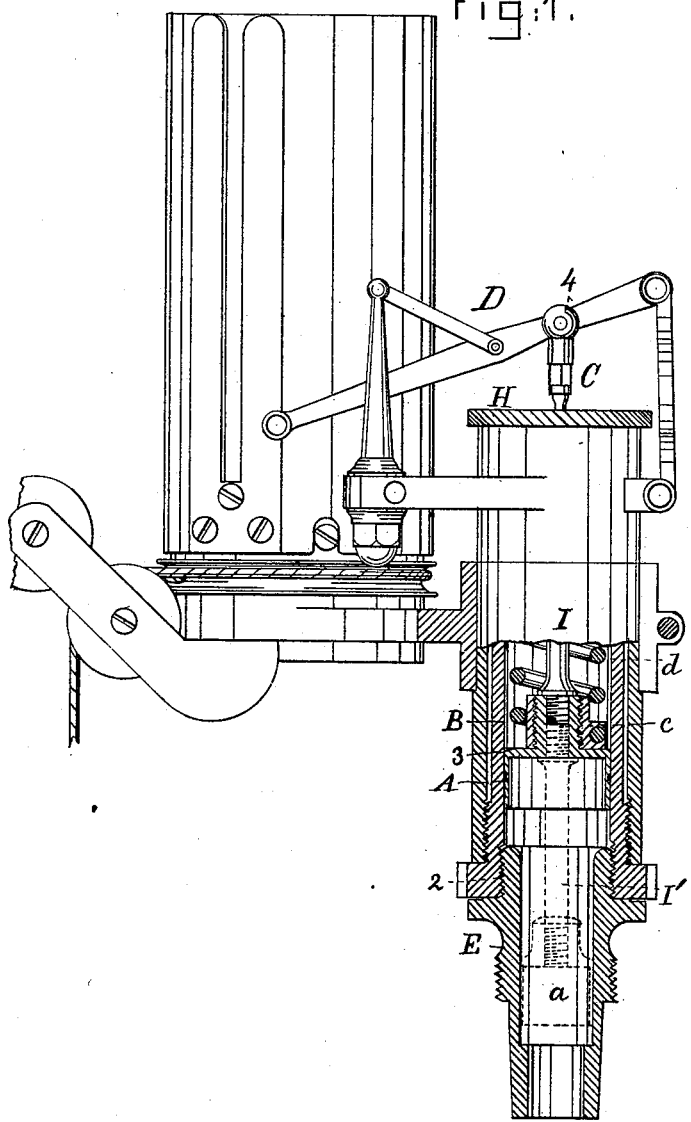
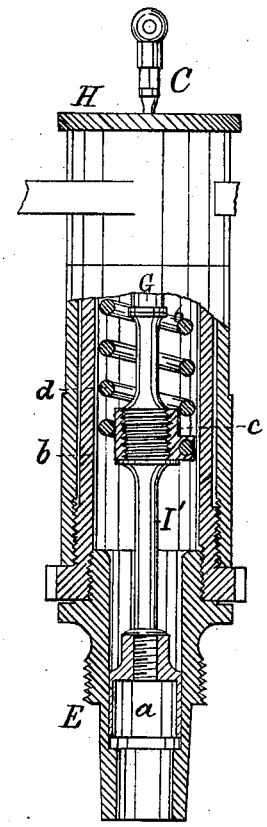
Witnesses.
L. F. Connor.
Arthur Reynolds.
Inventor.
Joseph W. Thompson
by Crosby Gregory Attys

UNITED STATES PATENT OFFICE.

JOSEPH W. THOMPSON, OF SALEM, OHIO, ASSIGNOR TO THE BUCKEYE ENGINE COMPANY, OF SAME PLACE, AND THE AMERICAN STEAM GAUGE COMPANY, OF BOSTON, MASSACHUSETTS.

CYLINDER FOR STEAM-ENGINE INDICATORS.

SPECIFICATION forming part of Letters Patent No. 244,094, dated July 12, 1881.

Application filed April 15, 1881. (No model.)

*To all whom it may concern:*

Be it known that I, JOSEPH W. THOMPSON, of Salem, county of Columbiana, State of Ohio, have invented an Improvement in Steam-Engine Indicators, of which the following description, in connection with the accompanying drawings, is a specification.

My invention relates to an indicator for steam-engines, and is shown embodied in an indicator patented to me August 31, 1875, No. 167,364, to which reference may be had.

In the indicators as now constructed the steam in the engine-cylinder acts upon a small piston to move it in opposition to a spring, the amount of such movement being registered by a suitable marker, and giving an exact record of the pressure in the engine-cylinder at every point of the stroke of its piston.

Springs of different stiffness are used for different engines, in accordance with the range of pressure under which the said engines work; but it is impracticable to make a spring that, in connection with indicators of ordinary construction, will measure accurately pressures above from two hundred and fifty to three hundred pounds to the inch, this having been sufficient for most engines formerly in use. It is, however, sometimes desirable to test engines acting under a much higher range of pressure, or to make other high-pressure tests, and to enable this to be done without constructing an entire new indicator for this special purpose is the object of my present invention, which consists in providing the indicator with a secondary cylinder and piston of a smaller area than the one commonly used, and preferably bearing some definite relation thereto—as, for example, one-half—so that a given intensity of steam-pressure, in acting on the said secondary piston, will produce but one-half the effect upon the spring that the same pressure would produce when acting on the main piston, and consequently the indicator will record, when using the secondary piston, pressures twice as great as it is possible to record with the main cylinder.

The main cylinder is usually made of a size only sufficient to properly receive the spring, so that it would be impracticable with this construction to place the secondary cylinder inside the main one as a bushing, and I have consequently in this invention placed the secondary cylinder in line with the main cylinder, but beyond the range of movement of the main piston, the secondary piston being provided with a longer piston-rod than the main piston, the said rod, however, engaging the spring and recording apparatus at the same relative points.

The secondary cylinder is shown as placed below the primary cylinder, between it and the engine-cylinder, so that, if desired, the secondary piston may be attached by a suitable rod to the main piston without removing the latter from its cylinder, the secondary piston being then alone affected by the pressure of the steam; but I generally prefer to remove the main piston and its rod, and substitute therefor the secondary piston and its rod.

Figure 1 is a side elevation of an indicator provided with my improvement, the secondary piston being shown in dotted lines as adapted to be attached to the main piston; Fig. 2, a similar view, showing the main piston and its rod removed and the secondary piston, with its rod, substituted therefor.

The piston A, working in the tube or cylinder B and connected by a piston-rod, I C, with the recording mechanism, may be of any usual construction, they being shown as in my former patent, and designated by the same letters as therein used.

The cylinder B has connected therewith, at its lower end, a union or coupling, E, by which to connect it with a suitable pipe leading to the engine-cylinder, it being constructed externally as in my former patent. This union formerly served merely to connect the apparatus with the engine and to conduct the steam into the cylinder B to act upon the piston A. In my present invention, however, I have accurately bored out the union E from the top downward to form a secondary cylinder, preferably of an area in some definite ratio to that of the cylinder *b*—in this instance one-half; and I provide with the instrument, in addition to main piston A, a secondary piston, $a$, accurately fitted to the secondary cylinder E.

The secondary piston $a$ is provided with a piston-rod, I′, made in continuation of the rigid portion I of the main piston-rod, by which it may be either connected with the main piston A, as shown in dotted lines, Fig. 1, or it may be extended entirely through the cylinder B and properly jointed with the portion C, suitably constructed to engage the recording mechanism D. In the latter case it is provided with a suitably-threaded portion and shoulder, $b$, to receive the ring $c$, connected with the lower or movable end of the spring $d$, which is connected, in the usual manner, at its other end with the head H of the cylinder B.

When the indicator is to be used with engines acting under the common range of pressures the secondary piston $a$ is removed, and the parts shown in full lines, Fig. 1, are used just as before, being provided with my improvement; but when the indicator is to be used with higher pressures than can be properly recorded by the stiffest spring $d$ that can be made, when compressed by the steam acting on the main piston A, the secondary piston $a$ is inserted in the secondary cylinder E, so that a pressure of a given intensity, in acting on its area, will produce the same effect on the spring $d$ and recording apparatus D that a pressure of one-half the said intensity would produce in acting on the main piston A of double the area of the said secondary piston $a$, and consequently the indicator can now be used with pressures twice as great as those that can be measured by the employment of the main piston A.

In the form shown in Fig. 1 it will be necessary only to detach the secondary cylinder E from the main cylinder B, as by unscrewing it at the threaded part 2, and then to connect the secondary piston $a$ with the main piston A, properly threaded at 3 to receive the secondary piston-rod I′, which, in this instance, forms a continuation of the rigid portion I of the main piston-rod. In the form shown in Fig. 2, however, the main piston B is disconnected from the spring $d$; and, preferably, its entire piston-rod, disconnected at the point 4 from the recording mechanism D, is removed, while the secondary piston $a$, with its piston-rod I′, made similar to the main piston-rod above the threaded portion $b$ that receives the spring-ring $c$ and extended therefrom down to the secondary cylinder, is substituted.

If desired, in changing the pistons only the lower portion of the piston-rod may be changed—as, for instance, below the point 6, where the rigid portion I joins the trunk G, containing the pivoted portion C; or in indicators of other construction the rod may be separated at any joint that occurs and the upper portion be used with either piston, as desired.

Still smaller pistons and cylinders may be used, if needed, interchangeable couplings E, differently bored, being used; or bushings can be inserted in the said coupling, as they will not interfere with the operation of the parts.

I claim—

1. A steam-engine indicator provided with main and secondary cylinders of different area, whereby suitable main and secondary pistons may be employed to register pressures of different intensity, in co-operation with the same spring, substantially as and for the purpose described.

2. In an indicator, the main and secondary cylinders, of different area, in line with one another, combined with a secondary piston to fit the said secondary cylinder and piston-rod therefor, adapted to engage the recording mechanism and spring at the same relative points as the main piston-rod, and properly extended or lengthened to receive the secondary piston in its cylinder, substantially as described.

In testimony whereof I have signed my name to this specification in the presence of two subscribing witnesses.

JOSEPH W. THOMPSON.

Witnesses:
SIMON SUMMES,
HENRY C. JONES.